(12) United States Patent
Ichien (10) Patent No.: US 10,063,115 B2
(45) Date of Patent: Aug. 28, 2018

(54) ROTOR INCLUDING SPECIFIC MAGNET STRUCTURE AND MOTOR PROVIDED WITH SAME

(71) Applicant: Nidec Corporation, Kyoto (JP)

(72) Inventor: Akira Ichien, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 318 days.

(21) Appl. No.: 14/766,806

(22) PCT Filed: Dec. 25, 2013

(86) PCT No.: PCT/JP2013/084576
§ 371 (c)(1),
(2) Date: Oct. 5, 2015

(87) PCT Pub. No.: WO2014/188628
PCT Pub. Date: Nov. 27, 2014

(65) Prior Publication Data
US 2016/0013689 A1    Jan. 14, 2016

(30) Foreign Application Priority Data

May 21, 2013   (JP) ................................. 2013-106888

(51) Int. Cl.
*H02K 21/12*   (2006.01)
*H02K 1/24*   (2006.01)
*H02K 1/27*   (2006.01)

(52) U.S. Cl.
CPC .................................. *H02K 1/2773* (2013.01)

(58) Field of Classification Search
CPC .................................. H02K 1/16; H02K 21/12
(Continued)

(56) References Cited

U.S. PATENT DOCUMENTS 4,242,610 A * 12/1980 McCarty .................. H02K 1/24
310/156.59
4,296,544 A   10/1981 Burgmeier et al.
(Continued)

FOREIGN PATENT DOCUMENTS

EP          2 538 528 A2    12/2012
EP          2538528 A2 *   12/2012 ........... H02K 1/2773
(Continued)

OTHER PUBLICATIONS

Official Communication issued in International Patent Application No. PCT/JP2013/084576, dated Mar. 11, 2014.

*Primary Examiner* — Thomas Truong
(74) *Attorney, Agent, or Firm* — Keating & Bennett, LLP (57) ABSTRACT

Provided is a rotor for use in an inner rotor-type motor, comprising a plurality of magnets arranged in a circumferential direction around the center axis, and a rotor core formed of a magnetic material. The rotor core has an inner core part and a plurality of outer core parts. The plurality of outer core parts and the plurality of magnets are alternately arranged in a circumferential direction at a radially outer side of the inner core part. The magnet has a pair of circumferential end surfaces which are magnetic pole surface, and at least one of them is a protruded surface. Also, the magnet has a portion of which circumferential width is wider than a circumferential width of an outer end surface. For this reason, the volume of the magnet can be increased and the magnetic force of the rotor can be increased, without the need to increase the diameter of the rotor. As a result, when such rotor is incorporated into a motor, the torque of the motor can be improved.

18 Claims, 11 Drawing Sheets (58) Field of Classification Search
USPC ..... 310/156.38, 156.44, 156.45, 156.48, 162
See application file for complete search history.

(56) References Cited

U.S. PATENT DOCUMENTS

| | | | |
|---|---|---|---|
| 4,302,693 | A | 11/1981 | Burgmeier et al. |
| 6,459,185 | B1 | 10/2002 | Ehrhart et al. |
| 8,860,271 | B2 | 10/2014 | Iwakiri et al. |
| 8,922,083 | B2 * | 12/2014 | Asahi .................. H02K 1/2706 |
| | | | 310/156.08 |
| 2006/0202580 | A1 * | 9/2006 | Lee ..................... H02K 1/2773 |
| | | | 310/156.45 |
| 2011/0121668 | A1 | 5/2011 | Condamin et al. |
| 2012/0200189 | A1 | 8/2012 | Murakami et al. |
| 2013/0009505 | A1 | 1/2013 | Watanabe et al. |
| 2013/0009506 | A1 | 1/2013 | Iwakiri et al. |
| 2013/0038162 | A1 * | 2/2013 | Pan ....................... H02K 21/16 |
| | | | 310/156.15 |
| 2014/0231656 | A1 * | 8/2014 | Kusner .................... G01T 3/06 |
| | | | 250/368 |

FOREIGN PATENT DOCUMENTS

| | | | | |
|---|---|---|---|---|
| JP | 55-100050 | A | 7/1980 | |
| JP | 60219947 | A * | 11/1985 | ............. H02K 1/278 |
| JP | 2009-268204 | A | 11/2009 | |
| JP | 2010-063285 | A | 3/2010 | |
| JP | 2010-183684 | A | 8/2010 | |
| JP | 2011-524735 | A | 9/2011 | |
| JP | 2013-021776 | A | 1/2013 | |
| JP | 2013-034344 | A | 2/2013 | |
| WO | WO 2013135376 | A2 * | 9/2013 | ............. H02K 21/16 |

* cited by examiner

ROTOR INCLUDING SPECIFIC MAGNET STRUCTURE AND MOTOR PROVIDED WITH SAME

BACKGROUND OF THE INVENTION

1. Field of the Invention

The present invention relates to a rotor and a motor.

2. Description of the Related Art

Conventionally, a rotor was disposed at the inner side of an armature, that is, a so-called inner rotor type motor has been known in the past. The rotor used in an inner rotor type motor can be mainly classified into an SPM (Surface Permanent Magnet) type rotor wherein a plurality of magnets can be attached to an outer circumferential surface of the rotor core, and an IPM (Interior Permanent Magnet) type rotor wherein a magnet is filled inside the rotor core.

In a typical IPM type rotor, as in the SPM type rotor, each magnet is disposed so that a pair of magnetic pole surfaces are directed towards a radially outer side and a radially inner side. For this reason, only the magnetic pole surface on a radially outer side is used to operate the motor. Therefore, in recent years, in order to effectively utilize the magnetic pole surface of the magnet, each of a pair of magnetic pole surfaces of the magnet is arranged in a circumferential direction, thereby proposing a so-called spoke type rotor structure.

A conventional rotor in which a pair of magnetic pole surfaces of the magnet are disposed to face towards a circumferential direction is disclosed in Japanese Unexamined Patent Application Publication No. 2010-63285, for example. The rotor disclosed in Japanese Unexamined Patent Application Publication No. 2010-63285 is provided with a magnet having an approximately rectangular parallelepiped shape, disposed at regular intervals in the periphery of the axial part. Also, each magnet is disposed so that a pair of magnetic pole surfaces face towards a circumferential direction, and the neighboring magnets are arranged so that identical poles face each other.

As described in Japanese Unexamined Patent Application Publication No. 2010-63285, a magnetic pole surface is effectively utilized in a spoke type rotor structure. For this reason, comparing the spoke type rotor structure with an SPM type rotor or an IPM type rotor (other than the spoke type), given that they are configured to generate the same magnetic force, the spoke type rotor structure is the one capable of designing a smaller diameter for the rotor.

However, in the recent years, not only the miniaturization of a motor but also the improvement of a torque is being required. That is, it is required to increase the magnetic force of the rotor without increasing the diameter of the rotor.

SUMMARY OF THE INVENTION

An exemplary first invention of the present application relates to a rotor which can be used in an inner rotor type motor, and has a plurality of magnets arranged in a circumferential direction and a rotor core formed of a magnetic material disposed in the periphery of a vertically extending center axis. The rotor core exists at a radially inner side than the magnet, and has an inner core part axially extending in a cylindrical shape and a plurality of outer core parts arranged in a circumferential direction with respect to a radially outer side of the inner core part. The plurality of outer core parts and the plurality of magnets are arranged alternately in a circumferential direction. The magnet has a pair of circumferential end surfaces which are magnetic pole surfaces. The magnetic pole surfaces having identical polarity of the plurality of magnets are configured to face one another in a circumferential direction, and at least one of the pair of circumferential end surfaces is a protruded surface which is more circumferentially protruded than a plane connecting an inner and an outer end thereof, and has an apex part which is most distant from the plane. The magnet is a rotor having a portion of which circumferential width is wider than a circumferential width of an outer end surface.

According to an exemplary invention of the present application, the volume of the magnet can be increased without the need to increase the diameter of the rotor. For this reason, the magnetic force of the rotor can be increased without the need to increase the diameter of the rotor. As a result, when the rotor is incorporated into the motor, the torque of the motor can be improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Exemplary preferred embodiments of the invention will be described below with reference to the drawings. Meanwhile, in the present application, a direction parallel to a center axis of a motor is referred to as an "axial direction", a direction orthogonal to the center axis of the motor is referred to as a "radial direction", and a direction along a circular arc having a center on the center axis of the motor is referred to as a "circumferential direction". Also in the present application, the axial direction is also referred to as a vertical direction to describe the shapes or relative positions of each part, a rotor side being the upper side with respect to a base part. However, there is no intention to limit the direction at the time of manufacture and use of a motor according to the invention by this definition of the vertical direction.

Also, the description of "a parallel direction" in the present application also includes an approximately parallel direction.

1. First Preferred Embodiment

Figure 1:
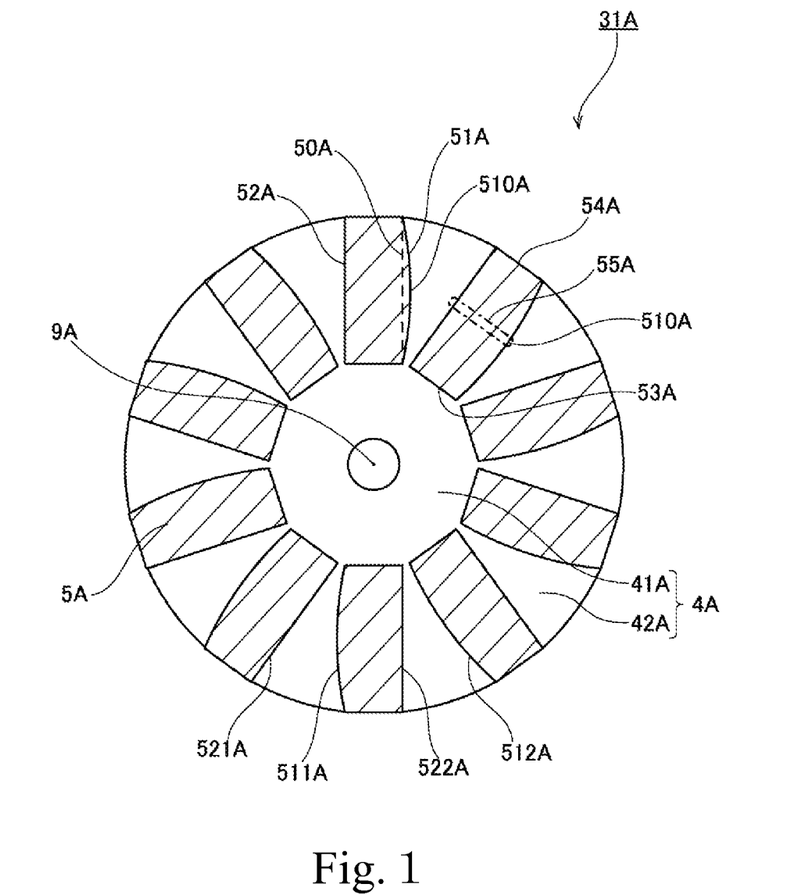
FIG. 1 is a cross-sectional view of a rotor related to a first preferred embodiment.

FIG. 1 is a cross-sectional view of a rotor 31A of a motor related to a first preferred embodiment. As shown in FIG. 1, the rotor 31A has a substantially cylindrical shape, and has a center on a center axis 9A which extends vertically. The rotor 31A is a rotor which can be used in an inner rotor type motor, and rotates on the center axis 9A.

As shown in FIG. 1, the rotor 31A has a rotor core 4A, and a plurality of magnets 5A arranged around the center axis 9A in a circumferential direction.

The rotor core 4A has an inner core part 41A and a plurality of outer core parts 42A, and is formed of formed of a magnetic material. The inner core part 41A exists at a radially inner side than the magnet 5A, and axially extends in a cylindrical shape. The plurality of outer core parts 42A exist at a radially outer side than the inner core part 41A, and is arranged in a circumferential direction. Further, the plurality of outer core parts 42A and the plurality of magnets 5A are alternately arranged in a circumferential direction.

The magnet 5A has a pair of circumferential end surfaces which are magnetic pole surfaces. In the present preferred embodiment, one of the pair of circumferential end surfaces of the magnet 5A is a protruded surface 51A, and the other is a flat surface 52A. The protruded surface 51A is more circumferentially protruded than a plane 50A connecting an inner end and an outer end thereof. The protruded surface 51A has an apex part 510A which is most distant from the plane 50A. Also, the flat surface 52A is positioned over a substantially identical surface as the plane 50A connecting an inner end and an outer end thereof.

Manufacturing costs of a magnet 5A, of which only one of the magnetic pole surfaces is a flat surface 52A are lower than those of a magnet, of which both of the magnetic pole surfaces are protruded surfaces. In this regard, by using a magnet 5A, of which one of the magnetic pole surfaces is a protruded surface 51A and the other is a flat surface 52A, manufacturing costs can be reduced, and still increase the volume of the magnet.

The magnet 5A has a wide part 55A with the largest circumferential width. In the present preferred embodiment, a circumferential width of an inner end surface 53A of the magnet 5A is substantially identical to a circumferential width of an outer end surface 54A. For this reason, a circumferential width of the wide part 55A is wider than a circumferential width of the outer end surface 54A. Meanwhile, in the present preferred embodiment, one of the circumferential end parts of the wide part 55A overlaps with the apex part 510A of the protruded surface 51A.

According to the features described above, the magnet 5A has a portion with a wider circumferential width than the outer end surface 54A. For this reason, it is possible to increase the volume of the magnet 5A without the need to increase the diameter of the rotor 31A. That is, the magnetic force of the rotor 31A can be increased without the need to increase the diameter of the rotor 31A. As a result, the torque of the motor can be improved when the rotor 31A is incorporated into the motor.

Here, when the rotor 31A rotates, a centrifugal force directed towards a radially outer side is applied to the magnet 5A, and the magnet 5A tries to jump out towards an outer side of the rotor core 4A. However, the magnet 5A of this rotor 31A has a wide part 55A which has a wider circumferential width than that of the outer end surface 54A. That is, in an outer end of the outer core part 42A adjacent to both circumferential sides of the magnet 5A, the intervals between the outer core parts 42A are narrower than the wide part 55A. For this reason, the magnet 5A can be inhibited from falling out to a radially outer side.

The plurality of magnets 5A are disposed so that the magnetic pole surfaces having identical polarity face each other in a circumferential direction. Also, as shown in FIG. 1, the plurality of magnets 5A according to the present preferred embodiment are disposed so that the protruded surface 51A and the flat surface 52A face each other in a circumferential direction. That is, a magnet 5A having an N-pole protruded surface 511A and an S-pole flat surface 522A, and a magnet 5A having an S-pole protruded surface 512A and an N-pole flat surface 521A are disposed alternately in a circumferential direction.

Accordingly, the N-pole protruded surface 511A of a magnet 5A, and the N-pole flat surface 521A of its neighboring magnet 5A face each other in a circumferential direction across an outer core part 42A. Likewise, the S-pole protruded surface 512A of a magnet 5A, and the S-pole flat surface 522A of its neighboring magnet face each other in a circumferential direction across an outer core part 42A.

By configuring the protruded surface 51A and the flat surface to face each other in a circumferential direction as described above, the shapes of the plurality of outer core parts 42A become identical. For this reason, the force applied to each outer core part 42A becomes identical when the rotor 31A rotates.

2. Second Preferred Embodiment 2-1. Entire Structure of Motor

Figure 2:
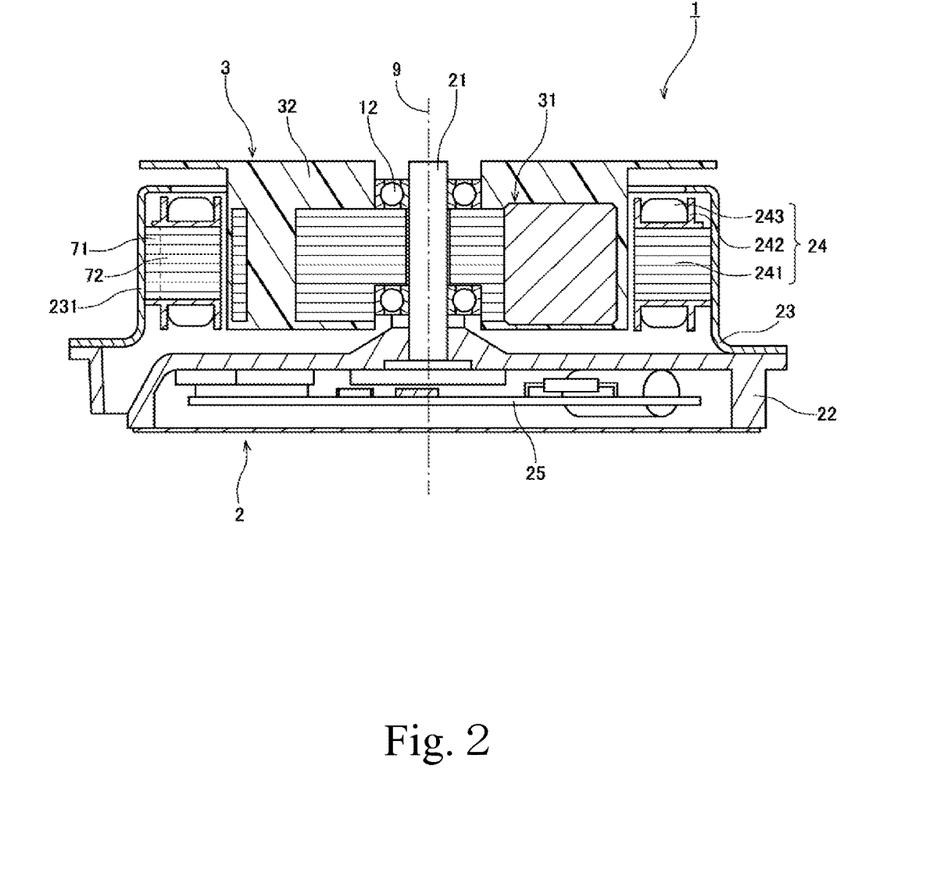
FIG. 2 is a vertical sectional view of a motor related to a second preferred embodiment.

Subsequently, a second preferred embodiment of the present invention will be described. FIG. 2 is a vertical sectional view of a motor 1. The motor 1 is used in an engine cooling fan of a vehicle, for example. However, the motor 1 of the present invention can also be used in other parts of a vehicle, or may be used in equipment other than vehicles. For example, the motor 1 of the present invention cam be used in OA equipment, medical equipment, large-sized industrial facilities, and the like.

The motor 1 has a rotor 31A disposed at a radially inner side of an armature 24, which is a so-called inner rotor type motor. As shown in FIG. 2, the motor 1 has a stationary part 2 and a rotating part 3. The stationary part 2 is fixed to a frame body of equipment such as a vehicle. The rotating part 3 is rotatably supported with respect to the stationary part 2.

The stationary part 2 of the present preferred embodiment has a shaft 21, a base part 22, a motor frame 23, an armature 24, and a circuit board 25.

The shaft 21 is a columnar member vertically extending along a center axis 9. The lower end part of the shaft 21 is fixed to the base part 22.

The base part 22 exists at a lower side of the rotating part 3, and expands in a radial direction. The base part 22 is a metallic material such as aluminum, etc. The motor frame 23 has a cylindrical part 231 having a cylindrical shape and having a center on the center axis 9. The base part 22 and a lower end part of the motor frame 23 are fixed by a locking screw.

The armature 24 generates a magnetic flux in response to a drive current. The armature 24 exists at an upper side of the base part 22, and is disposed on a radially outer side of the rotor 31. The armature 24 has a stator core 241, an insulator 242, and a plurality of coils 243. The stator 241 is formed of, for example, a laminated steel plate obtained by a plurality of electromagnetic steel plates laminated in an axial direction. The stator core 241 has a core back 71 having a ring shape, and a plurality of teeth 72 protruding from the core back 71 towards a radially inner side. The core back 71 is fixed to an inner peripheral surface of the cylindrical part 231 of the motor frame 23. The plurality of teeth 72 are circumferentially arranged at substantially regular intervals.

The insulator 242 is formed of a resin which is an insulating material. The upper surface, the lower surface, and both circumferential end surfaces of each tooth 72 are covered by the insulator 242. The coil 243 is composed of conductive wires wound around the insulator 242. By being interposed between the teeth 72 and the coil 243, the insulator 242 prevents the teeth 72 and the coil 243 from being electrically short-circuited. Meanwhile, insulation coating can be performed on the surface of the teeth, instead of employing an insulator 242.

The circuit board 25 is disposed on the lower side of the base part 22. An electronic component for driving the motor 1 is installed to the circuit board 25. An end part of the conductive wire which forms the coil 243 is soldered or welded to the circuit board 25, and electrically connected to the electronic component on the circuit board. Electric current, which is supplied from an outside power source, flows to the coil 243 through the circuit board 25.

The rotating part 3 has a rotor 31 and a rotor holder 32, and is rotatably supported with respect to the shaft 21. A bearing mechanism 12 is interposed between the shaft 21, and the rotor 31 and the rotor 32. The bearing mechanism 12 of the present preferred embodiment uses a ball bearing wherein a sphere is interposed to relatively rotate an outer ring and an inner ring. However, other types of bearing such as a slide bearing or liquid bearing, etc. can also be used.

The rotor 31 is disposed on a radially inner side of the armature 24, and rotates on the center axis 9. The outer peripheral surface of the rotor 31 faces the inner end surface of the plurality of teeth 72 of the armature 24 in a radial direction. The rotor holder 32 is a resin member which holds the rotor 31. The rotor holder 32 is formed, for example, by insert molding, the rotor 31 being an insert part. The rotor holder 32 is connected to, for example, a driving part such as an impeller, etc. of a fan by a locking screw.

In a motor 1 described above, when a drive current is supplied to the coil 243 of the stationary part 2, a radial magnetic flux is generated at the plurality of teeth 72 of the stator core 241. Further, by the action of magnetic flux between the teeth 72 and the rotor 31, a radial torque is generated. As a result, the rotating part 3 rotates on the center axis 9 with respect to the stationary part 2.

2-2. Structure of Rotor

Figure 3:
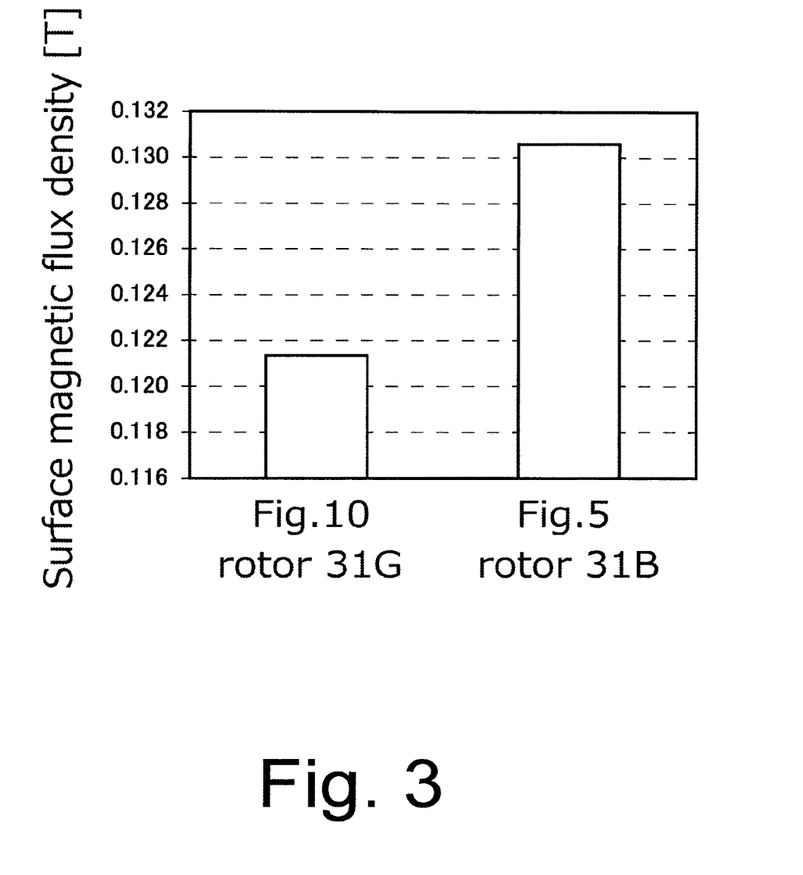
FIG. 3 is a cross-sectional view of a rotor related to a second preferred embodiment.
Figure 4:
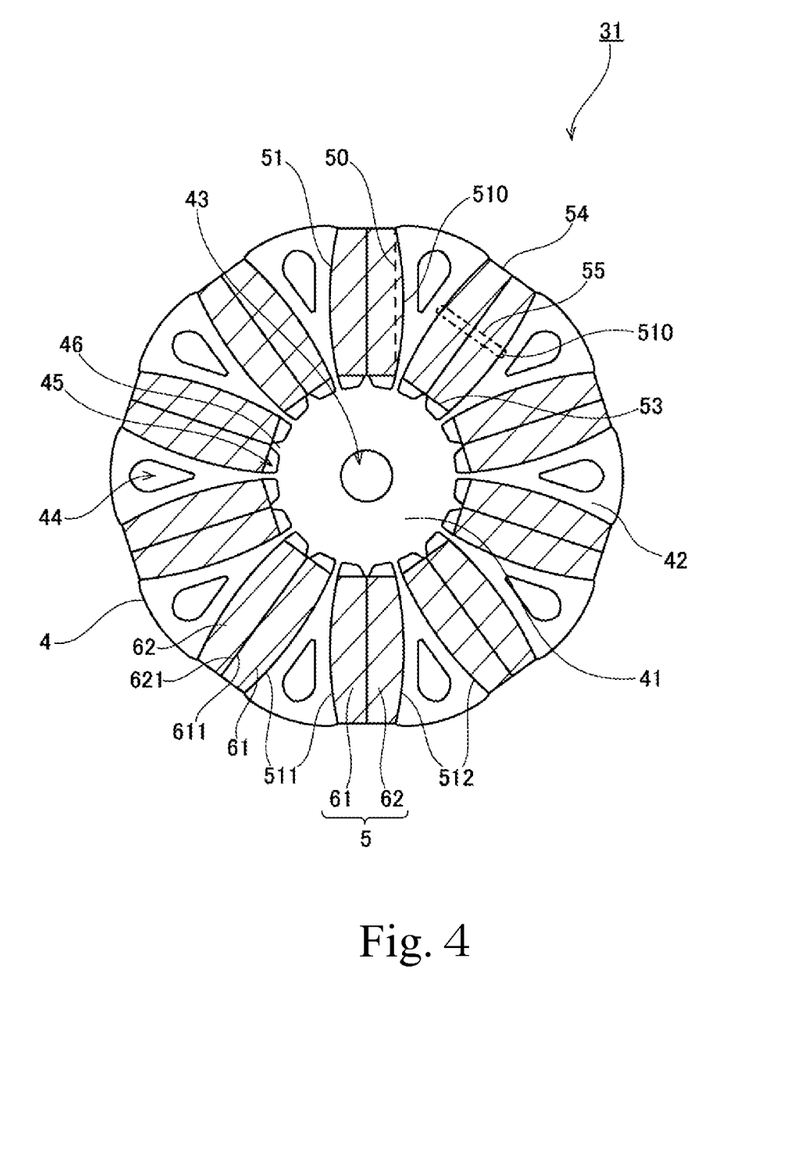
FIG. 4 is a partial cross-sectional view of a rotor related to a second preferred embodiment.

Subsequently, a detailed structure of the rotor 31 will be described. FIG. 3 is a cross-sectional view of the rotor 31. FIG. 4 is a partial cross-sectional view of the rotor 31.

The rotor 31 has a substantially cylindrical shape, and has a center on the center axis 9. The rotor 31 has a rotor core 4, and a plurality of magnets 5 circumferentially arranged around the center axis 9.

The rotor core 4 is a cylindrical member surrounding the shaft 21. The rotor core 4 of the present preferred embodiment is formed of a laminated steel plate obtained by a plurality of electromagnetic steel plates laminated in an axial direction. The rotor core 4 has an inner core part 41 and a plurality of outer core parts 42.

The inner core part 41 exists at a radially inner side than the magnet 5, and axially extends in a cylindrical shape. A shaft hole 43 which axially penetrates the inner core part 41 is provided at the approximate center of the inner core part 41. The shaft 21 is inserted into the shaft hole 43.

The plurality of outer core parts 42 exist at a radially outer side than the inner core part 41, and is arranged in a circumferential direction. The inner end of the outer core part 42 is connected to the inner core part 41. Also, the plurality of outer core parts 42, and the plurality of magnets 5 are alternately arranged in a circumferential direction. Meanwhile, the adjacent surfaces of the neighboring outer core part 42 and magnet 5 are in contact facing each other in a circumferential direction. Detailed structure of the rotor core 4 will be described later.

Each magnet 5 has a pair of circumferential end surfaces which are magnetic pole surfaces. The plurality of magnets 5 are disposed so that the magnetic pole surfaces having identical polarity face each other in a circumferential direction. In the present preferred embodiment, the pair of circumferential end surfaces of each magnet 5 are protruded surfaces 51. As shown in FIG. 3, in the present preferred embodiment, N-pole protruded surfaces 511 face each other across the outer core part 42 in a circumferential direction, and S-pole protruded surfaces 512 face each other across the outer core part 42 in a circumferential direction.

The protruded surface 51 is more circumferentially protruded than a plane 50 connecting an inner end and an outer end thereof. The protruded surface 51 has an apex part 510 which is most distant from the plane 50.

Also, the protruded surface 51 of the present preferred embodiment is a smoothly curved surface. That is, the surface heading towards the apex part 510 from the inner end of the protruded surface 51 is a curved surface. Also, the surface heading towards the apex part 510 from the outer end of the protruded surface 51 is a curved surface. For this reason, the normal of the protruded surface 51 heads towards a radially outer side along a radially outer direction, unlike when compared to a case in which the surface heading towards the apex part 510 from the outer end of the protruded surface 51 is a flat surface. As a result, in the outer core part 42, a magnetic flux from the protruded surface 51 can be easily directed to a radially outer side. Accordingly, when the rotor is incorporated into the motor, the torque of the motor 1 can be further improved.

As to each magnet 5, a circumferential width of the inner end surface and a circumferential width of the outer end surface 54 are substantially identical. As to each protruded surface 51, the distance between the apex part 510 and the inner end of the protruded part 51, and the distance between the apex part 510 and the outer end of the protruded part 51 are substantially identical. For this reason, both end parts of a wide part 55, which has the largest circumferential width of the magnet 5, overlap with each apex part 510 of the pair of protruded surfaces 51.

The wide part 55 has a wider circumferential width than the inner end surface 53 and the outer end surface 54. For this reason, the intervals between the outer end surfaces of the outer core parts 42 adjacent to both circumferential sides of the magnet 5 are narrower than the wide part 55. Accordingly, the magnet 5 can be inhibited from falling out to a radially outer side to a radially outer side. Likewise, the magnet 5 can be inhibited from moving towards a radially inner side.

As described above, the magnet 5 has a portion of which width is wider than a circumferential width of the outer end surface 54. For this reason, the volume of the magnet 5 can be increased without the need to increase the diameter of the rotor 31. That is, the magnetic force of the rotor 31 can be increased without the need to increase the diameter of the rotor 31. As a result, when the rotor 31 is incorporated into the motor 1, the torque of the motor 1 can be improved. In the present preferred embodiment, the volume of the magnet 5 can be increased by the configuration in which both sides of the pair of circumferential end surfaces of the magnet 5 are protruded surfaces. Accordingly, the torque of the motor 1 can be further improved.

Also, the magnet 5 has a portion of which circumferential width is wider than a circumferential width of the inner end surface 53. For this reason, a circumferential width of the inner end surface 53 does not need to be increased. That is, it is easy to secure the width of the region which connects the outer core part 42 and the inner core part 41. Accordingly, it is easy to manufacture the rotor core 4.

Meanwhile, the magnet 5 of the present preferred embodiment is a ferritic magnet. In recent years, the price of rare earth magnet has been increasing. For this reason, in order to lower the costs, a ferritic magnet is used, which is cheaper in comparison to a rare earth magnet. However, a technical requirement of lowering the costs and yet obtaining a higher torque in comparison to conventional motors still exists. When the structure of rotor 31 according to the present preferred embodiment is employed, it is not only possible to use a ferritic magnet, but it is also possible to increase the volume of the magnet 5, and improve the torque of the motor 1. As described above, the present invention is especially valuable in a rotor using a ferrite magnet.

However, a magnet other than a ferritic magnet can also be used in the rotor of the present invention. For example, a neodymium magnet can be used. In such case, the diameter of the rotor can be further reduced in order to lower the amount of magnet usage. Also, by using a magnet which is configured to have a pair of circumferential end surface which are magnetic pole surfaces, one side being a protruded surface and the other side a flat surface, it is possible to provide a rotor which satisfies the requirement of low cost as much as possible.

Here, as shown in FIG. 3, each magnet 5 of the present preferred embodiment is formed of two magnet pieces, a first magnet piece 61 and a second magnet piece. The first magnet piece 61 and the second magnet piece 62 are circumferentially adjacent to each other.

The first magnet piece 61 and the second magnet piece 62 respectively have a pair of circumferential end surfaces which are magnetic pole surfaces. One of the circumferential end surfaces of the first magnet piece 61 forms the N-pole protruded surface 511 of the magnet 5. One of the circumferential end surfaces of the first magnet piece 61 is an S-pole flat magnetic pole surface, and an S-pole adsorption surface 611 which absorbs the second magnet piece 62. Likewise, one of the circumferential end surfaces of the second magnet piece 62 is an N-pole flat magnetic pole surface, and an N-pole adsorption surface 621 which absorbs the first magnet piece 61. One of the circumferential end surfaces of the second magnet piece 62 forms the S-pole protruded surface 512 of the magnet 5. The S-pole adsorption surface 611 of the first magnet piece 61 and the N-pole adsorption surface 621 of the second magnet piece 62 absorb each other by magnetic force.

As described above, each magnet 5 is formed of two magnet pieces 61, 62 having magnetic pole surface, one of which is a protruded surface and the other is a flat surface. The manufacturing cost of a magnet wherein one of the magnetic pole surfaces is a flat surface is lower than a magnet wherein both of the magnetic pole surfaces are protruded surfaces. In this regard, when compared to a case in which each magnet 5 is formed of a single type of magnet wherein both of the magnetic pole surfaces are protruded surfaces, the manufacturing cost can be reduced.

Also, since each magnet 5 is formed of a plurality of magnet pieces, eddy-current loss can be suppressed. For this reason, when the rotor 31 is incorporated into the motor 1, the torque of the motor 1 can be improved.

Meanwhile, in the present preferred embodiment, each magnet 5 is formed of two magnet pieces; however, the present invention is not limited thereto. Each magnet 5 can be formed of a single magnet piece. Also, each magnet 5 can be formed of three or more magnet pieces circumferentially adjacent to one another. In such case, as to the magnet pieces on both circumferential ends of the three or more magnet pieces, the surfaces which are circumferentially adjacent to the outer core part 42 become protruded surfaces 51.

Subsequently, a detailed structure of the rotor core 41 will be described.

Each outer core part 42 is provided with a through hole 44 which axially penetrates the outer core part 42. For this reason, the weight of the rotor 31 can be reduced. Meanwhile, in the present preferred embodiment, the through hole 44 is provided to every outer core part 42; however, the present invention is not limited thereto. The plurality of core parts 42 do not need to be provided with the through hole 44. Also, the through hole 44 can be provided to any one of a plurality of outer core parts 42, or to two or more outer core parts 42.

As shown in FIG. 4, in the present preferred embodiment, the through hole 44 has a so-called tear shape. Specifically, the through hole 44 is surrounded by two substantially planar parts 441 which parts away from each other as heading towards a radially outer side, an inner connection part 442 which connects the inner end of the two substantially planar parts 441, and an outer connection part 443 which connects the outer end of the two substantially planar parts 441.

Here, among the circumferential end surfaces of the outer core parts 42, a point at which the tangent with respect to a cross section orthogonal to the center axis 9 is parallel with the substantially planar part 441 is defined as a parallel point 421. In a peripheral part 422 of the parallel point 421 of the outer core part 42, the circumferential intervals between the substantially planar part 441 and the circumferential end surface of the outer core part 42 are substantially regular. In the present preferred embodiment, the peripheral part 422 exists between an inner end vicinity of the substantially planar part 441 and a circumferential end surface of the outer core part 42. That is, in the inner end vicinity of the through hole 44, the circumferential intervals between the edge of the through hole 44 and the circumferential end surface of the outer core part 42 are substantially regular.

Also, in a radially outer side than the peripheral part 422, the circumferential intervals between the edge of the through hole 44 and the circumferential end surface of the outer core part 42 expand in a radially outward direction. For this reason, the flow of magnetic flux which heads towards an outer end surface of the outer core part 42, which is the magnetic pole surface of the rotor core 4, from the magnet 5 can be efficiently guided. Accordingly, it is possible to suppress the degrading of the torque of the motor 1 which can be caused by the through hole 44, unlike when compared to a rotor having a through hole of which circumferential intervals between the edge of the through hole and the circumferential end surface of the outer core part do not expand in a radially outward direction.

As shown in FIG. 3, a non-magnetic layer 45 interposed between an inner end surface 53 of each magnet 5, and an inner circumferential surface of the inner core part 41. For this reason, the short circuiting of the magnetic flux in a radially inner side of each magnet 5 can be suppressed. In the present preferred embodiment, the non-magnetic layer 45 is a resin which composes the rotor holder 32. Meanwhile, the non-magnetic layer 45 can be another type of a non-magnetic material. Also, a gap can be interposed between the inner end surface 53 of each magnet 5 and the outer circumferential surface of the inner core part 41, instead of a non-magnetic layer 45.

The rotor core 4 protrudes from the outer circumferential surface of the inner core part 41 into the non-magnetic layer 45, and has a projection 46. The projection 46 is in contact with the inner end surface 53 of the magnet 5. For this reason, it is possible to suppress the occurrence of positional difference of the magnets 5 at a radially inner side.

Meanwhile, the projection 46 of the present preferred embodiment is protruded from the outer circumferential surface of the inner core part 41 into the non-magnetic layer 45; however, the present invention is not limited thereto. The projection 46 can be circumferentially protruded into the non-magnetic layer 45 from a side surface of the outer core part 42, and can be in contact with the inner end surface of the magnet 5.

Also, the outer core part 42 of the present preferred embodiment does not radially overlap with the outer end surface 54 of the magnet 5. For this reason, the short circuiting of the magnetic flux in a radially outer side of the magnet 5 can be suppressed. Accordingly, the torque of the motor 1 can be prevented from being degraded.

Here, as described above, if a fixture extended along the outer end surface 54 of the magnet 5 from the circumferential end part of the outer end surface of the outer core part 42 is installed in order to inhibit the magnet 5 from falling out to a radially outer side, the fixtures of two neighboring outer core parts 42 will face each other along the outer end surface 54 of the magnet 5, and thereby form a magnetic path. Then, with respect to a radially outer side of each magnet 5, the magnetic flux from the N-pole to the S-pole of the magnet 5 will be short-circuited by the fixture of the outer core part 42 on the N-pole side and the fixture of the outer core part 42 on the S-pole side. In such case, the effective magnetic flux of the rotor 31 will be degraded, and therefore the torque of the motor 1 will also be degraded.

As to the rotor 31 of the present preferred embodiment, the magnet 5 has a portion of which circumferential width is wider than the outer end surface 54 in order to inhibit the magnet from falling out to a radially outer side. In this regard, it is unnecessary to install a fixture.

3. Modification

The exemplary preferred embodiments of the invention have been described above; however, the present invention is not limited thereto.

Figure 5:
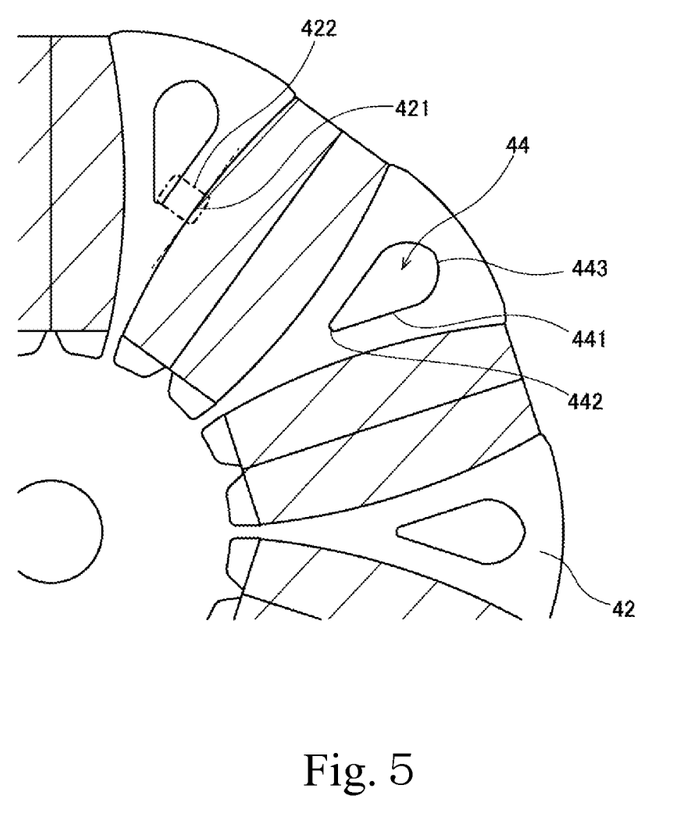
FIG. 5 is a cross-sectional view of a rotor related to a modified example.

FIG. 5 is a cross-sectional view of a rotor 31B which relates to a first modified example. As shown in FIG. 5, one of a pair of circumferential end surfaces of each magnet 5B is a protruded surface 51B, and the other is a flat surface 52B.

A plurality of magnets 5B are disposed so that the magnetic pole surfaces having identical polarity face each other in a circumferential direction. Also, in the example of FIG. 5, the plurality of magnets 5B are disposed so that their protruded surfaces 51B face each other in a circumferential direction. That is, the plurality of magnets 5B are disposed so that their flat surfaces 52B face each other in a circumferential direction.

Accordingly, a plurality of outer core parts 42B are either arranged so that both of the pair of circumferential end surfaces are in contact with the protruded surface 51B, or so that both of the pair of circumferential end surfaces are in contact with the flat surface 52B. For this reason, during a non-operation status of the motor, the flow of magnetic flux from neighboring magnets 5B at both circumferential of the outer core part 42B is symmetrical. Such rotor 31B is efficient when used in a forward-reverse two-way rotation motor.

Figure 6:
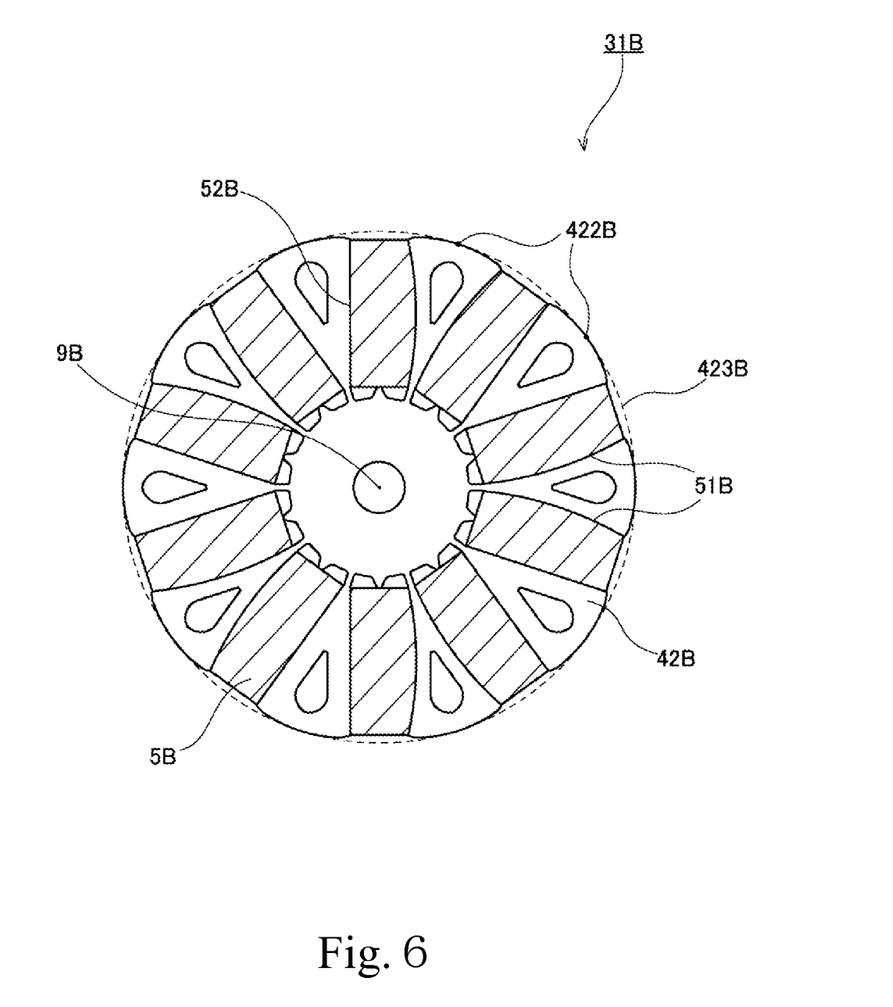
FIG. 6 is a cross-sectional view of a rotor related to a modified example.

FIG. 6 is a cross-sectional view of a rotor 31C according to another modified example. According to the example shown in FIG. 6, a pair of circumferential end surfaces of each magnet 5C are protruded surfaces 51C. The protruded surface 51C is more circumferentially protruded than a plane 50C connecting an inner end and an outer end thereof. The protruded surface 51C has an apex 510C which has the largest distance from the plane 50C.

In the example shown in FIG. 6, a distance between the inner end of the protruded surface 51C and the apex part 510C is smaller than the distance between the outer end of the protruded surface 51C and the apex part 510C. For this reason, a portion near the outer end surface of the outer core part 42C can be expanded widely. Accordingly, the magnetic flux which started from the surface of the magnet 5C can be easily directed to the outer end surface of the outer core part 42C.

Figure 7:
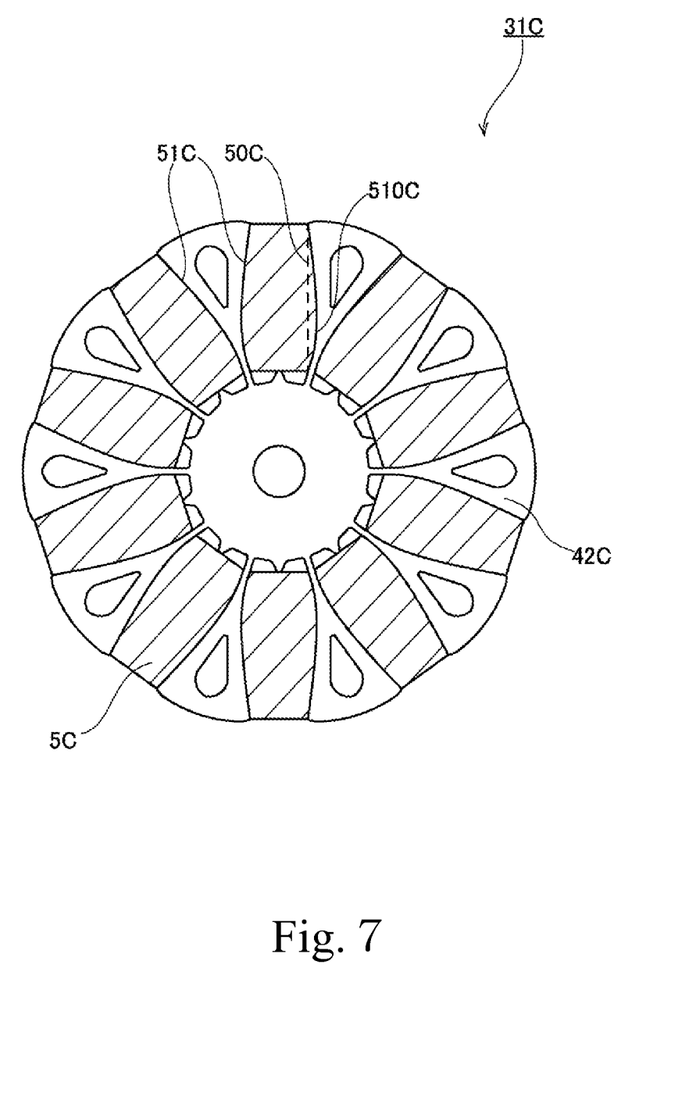
FIG. 7 is a cross-sectional view of a rotor related to a modified example.

FIG. 7 is a cross-sectional view of a rotor 31D which relates to another modified example. In the example shown in FIG. 7, a pair of circumferential end surfaces of each magnet 5D are protruded surfaces 51D. The protruded surface 51D is more protruded than a plane 50D connecting an inner end and an outer end thereof. The protruded surface 51D has an apex part 510D which is most distant from the plane 50D.

In the example shown in FIG. 7, the apex part 510D is a planar surface which has a width in a radial direction, and parallel with the plane 5D. That is, the apex part 510D is an axially extending planar surface. As described above, the apex part 510D does not need to be a point on a cross-section perpendicular to the center axis, but can be a line having a width in a radial direction. For this reason, a portion having a wide circumferential width of the magnet 5D can be enlarged. Accordingly, the volume of the magnet 5D can be further increased. As a result, when the rotor 31D is incorporated into the motor, the torque of the motor can be further improved.

Meanwhile, in the above preferred embodiment, the protruded surface is a smooth, curved surface; however, the present invention is not limited thereto. In the example shown in FIG. 7, as to the protruded surface 51D, a surface heading towards the apex part 510D from the outer end and a surface heading towards the apex part 510D from the inner end are curved surfaces. Also, the apex part 510D is a planar surface. As described above, the protruded surface 51D can be configured with curved surfaces and planar surface.

Figure 8:
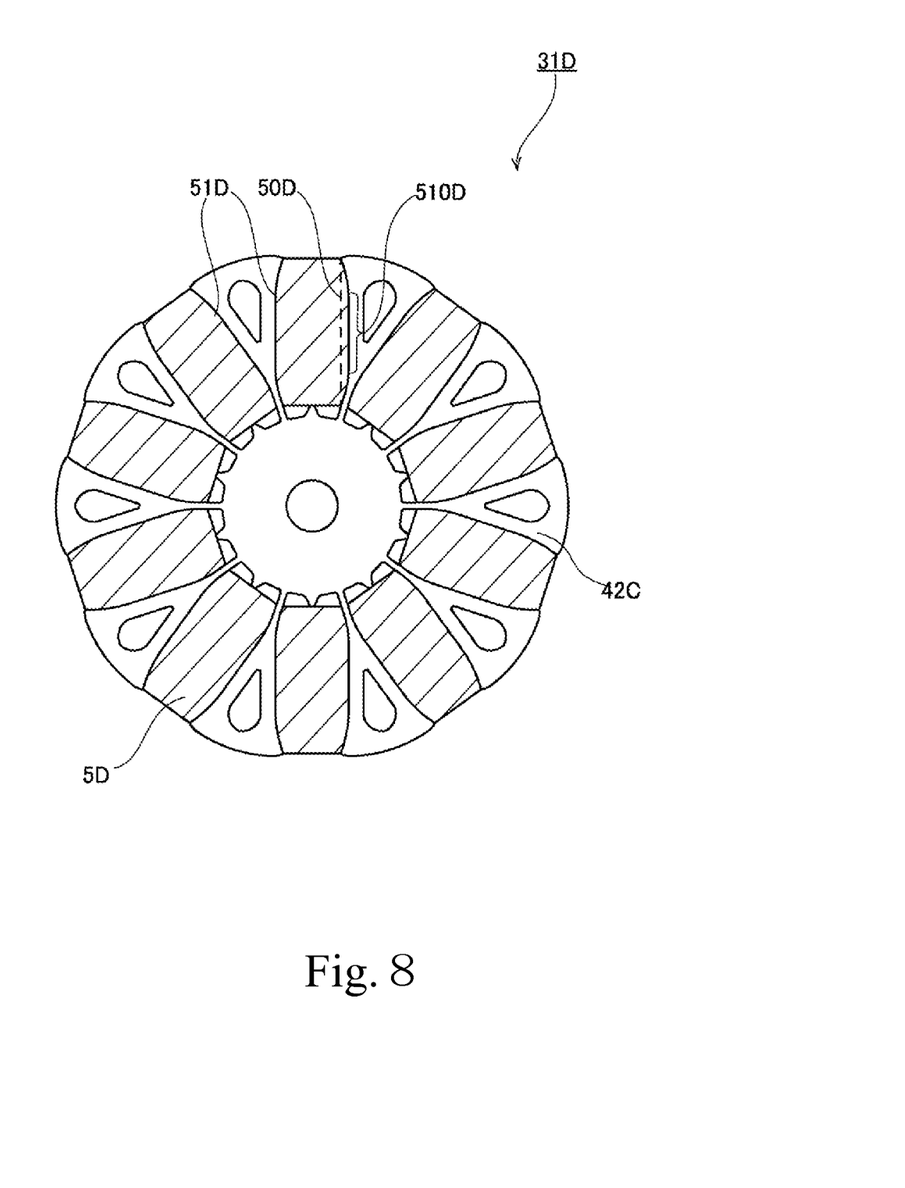
FIG. 8 is a cross-sectional view of a rotor related to a modified example.

FIG. 8 is a cross-sectional view of a rotor 31E which relates to another modified example. In the example shown in FIG. 8, a pair of circumferential end surfaces of each magnet 5E are protruded surfaces 51E. The protruded surface 51E is more circumferentially protruded than a plane 50E connecting an inner end and an outer end thereof. The protruded surface 51E has an apex part 510E which is most distant from the plane 50E.

In the example of FIG. 8, in the protruded surface 51E, the surface which heads towards the apex part 510E from the inner end is a planar surface. Also, in the protruded surface 51E, the surface which heads towards the apex part 510E from the outer end is a planar surface. For this reason, a portion near the outer end surface of the outer core part 42E is expanded widely, unlike when compared to a case in which the surface heading towards the apex part 510E from the outer end of the protruded surface 51E is a curved surface. Accordingly, it is easy for the magnetic flux from the protruded surface 51E to head towards the outer end surface of the outer core part 42E.

Meanwhile, in the example shown in FIG. 8, both the surface heading towards the apex part 510E from the outer end of the protruded surface 51E and the surface heading towards the apex part 510E from the inner end are planar surfaces; however, the present invention is not limited thereto. The protruded surface 51E can be composed of a combination of curved surfaces and planar surfaces.

Figure 9:
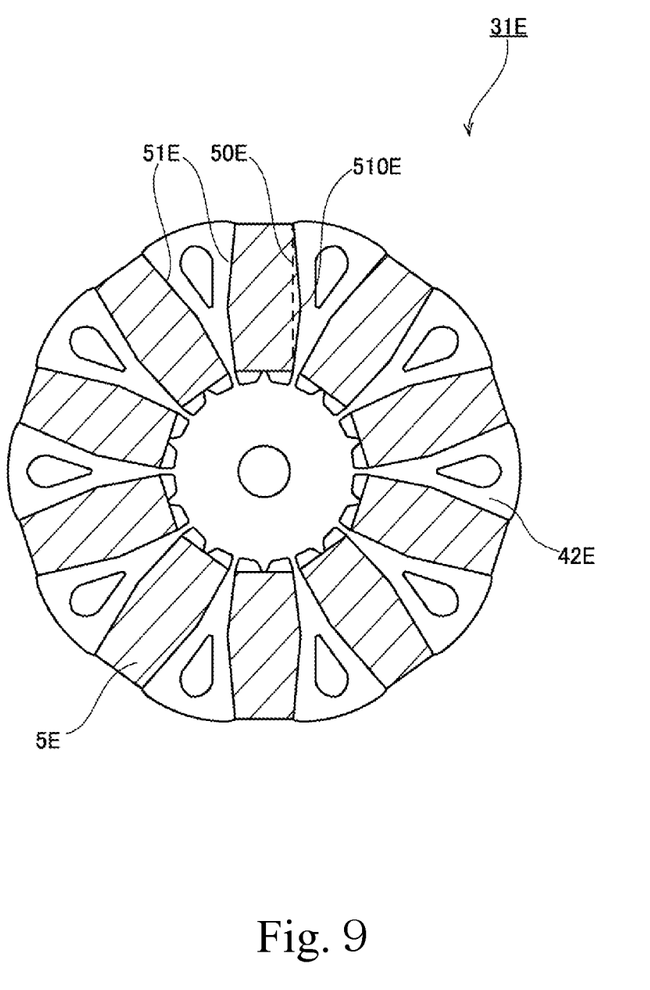
FIG. 9 is a cross-sectional view of a rotor related to a modified example.

FIG. 9 is a cross-sectional view of a rotor 31F which relates to another modified example. In the example shown in FIG. 9, as to a magnet 5F, the width of a wide part 55F which has the widest circumferential width is wider than an inner end surface 53F.

That is, the magnet 5F has a portion of which circumferential width is wider than a circumferential width of the inner end surface 53F. For this reason, it is possible to suppress the occurrence of positional difference of the magnets 5F at a radially inner side.

A non-magnetic layer 45F is interposed between the inner end surface 53F of each magnet 5F and the circumferential surface of an inner core part 41F. For this reason, the short circuiting of the magnetic flux in a radially inner side of each magnet 5F can be suppressed. Accordingly, when the rotor 31F is incorporated into the motor, the torque of the motor can be improved.

Also, in the example shown in FIG. 9, the entire inner end surface 53F of the magnet 5F is adjacent to the non-magnetic layer 45F. That is, in the above-described preferred embodiment, a rotor core has a projection which is in contact with the inner end surface of the magnet; however, in the example of FIG. 9, the rotor core 4F does not have a projection. For this reason, the short circuiting of the magnetic flux in a radially inner side of each magnet 5F can be suppressed. Accordingly, when the rotor 31F is incorporated into the motor, the torque of the motor can also be improved.

Furthermore, the detailed shapes of the respective member may be different from the shapes shown in the respective drawings of this specification. Moreover, the respective elements shown in the preferred embodiments and the modification may be appropriately combined with each other so that contradiction does not occur.

4. Simulation

Figure 10:
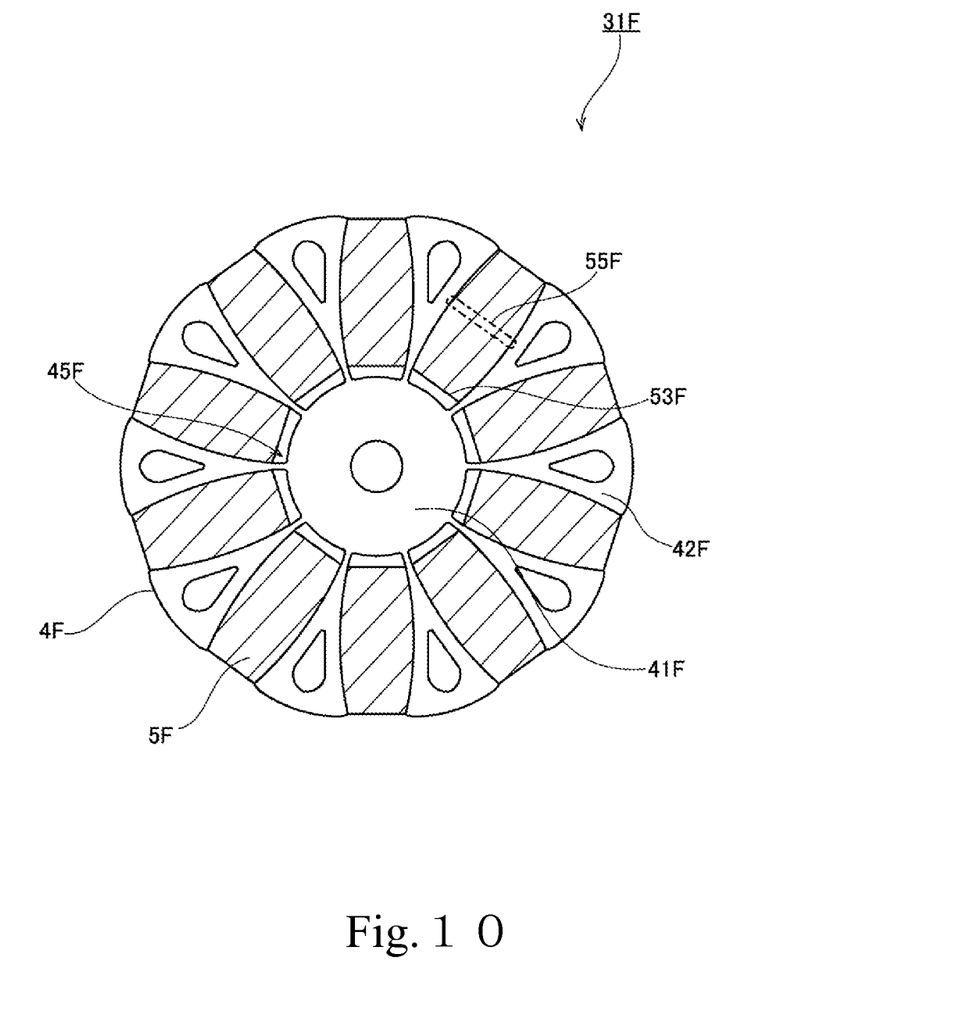
FIG. 10 is a cross-sectional view of a rotor having a conventional magnet.
Figure 11:
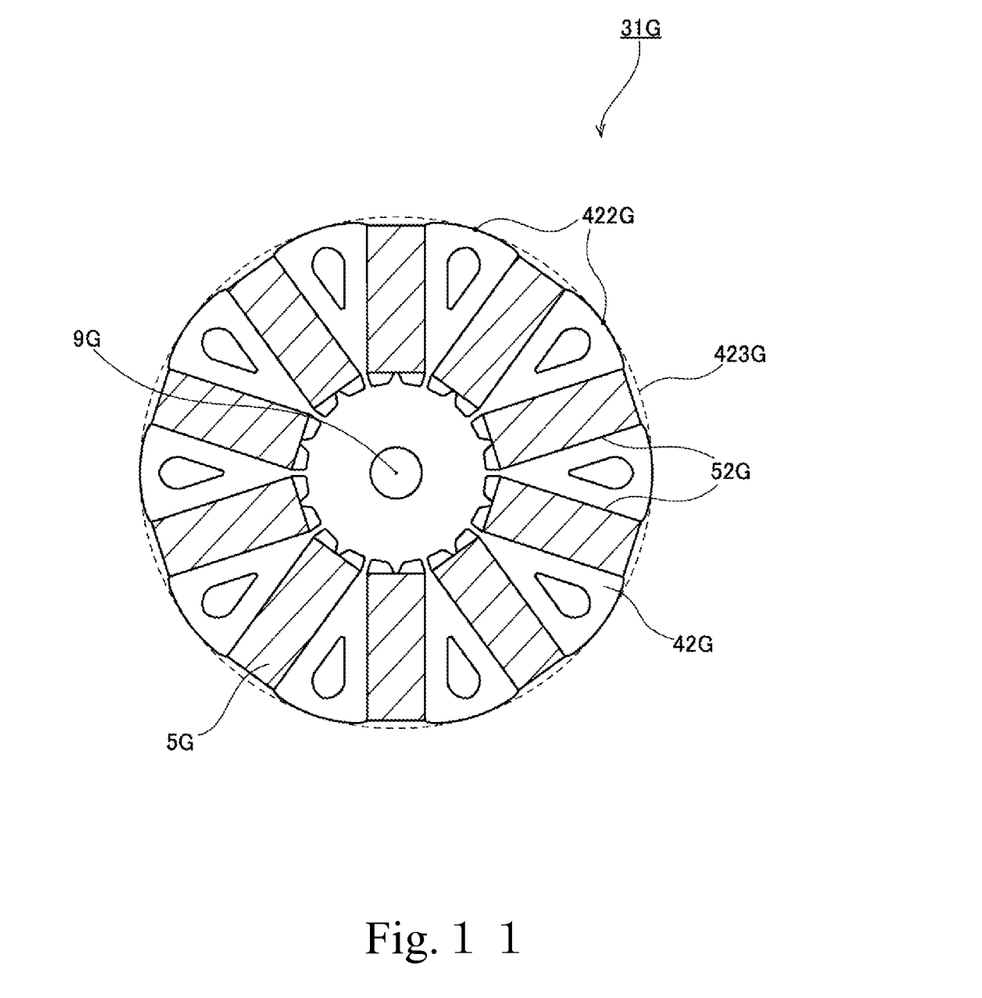
FIG. 11 is a drawing which shows the result of simulation.

Finally, a difference in surface magnetic flux density will be described, depending on whether or not the magnet has a protruded surface. FIG. 10 is a sectional view of a rotor 31G having a conventional magnet 5G in a substantially rectangular shape. FIG. 11 is a drawing which shows a simulation result of surface magnetic flux density of the rotor 31G and the rotor 31B.

A simulation was performed to measure a surface magnetic flux density of the rotor 31G illustrated in FIG. 10, which has a magnet 5G of which the pair of circumferential end surfaces are flat surfaces 52G, the surfaces being magnetic pole surfaces. The rotor 31G has identical shape and size as the rotor 31B, except for the shape of the magnet and both circumferential end surfaces of the outer core part 42G.

Specifically, on a circle 423G having the center axis 9G as the center, and passing through the most protruded points 422G, starting from one of the most protruded points 422G, the magnetic flux density was calculated by performing simulation with 0.5 degree intervals around the center axis 9G. Here, the most protruded point 422G refers to a point among the outer end surface of the outer core part 42G having the largest distance from the center axis 9G. Here, a root-mean-square of the magnetic flux at each position is defined as the surface magnetic flux density.

Also, likewise, a simulation to calculate the surface magnetic flux density was performed with a rotor 31B as shown in FIG. 5, which has a magnet 5B wherein one of a pair of circumferential end surfaces which are magnetic pole surfaces is a protruded surface 51B, and the other is a flat surface 52B.

Specifically, on a circle 423B having the center axis 9B as the center, and passing through the most protruded points 422B, starting from one of the most protruded points 422B, the magnetic flux density was calculated by performing simulation with 0.5 degree intervals around the center axis 9G. Here, the most protruded point 422B refers to a point among the outer end surface of the outer core part 42B having the largest distance from the center axis 9B. Here, as with rotor 31G, a root-mean-square of the magnetic flux at each position is defined as the surface magnetic flux density.

As shown in FIG. 11, the surface magnetic flux density of the rotor 31B is bigger than the surface magnetic flux density of the rotor 31G by approximately 7.6%.

That is, the rotor 31B which has a magnet 5B wherein one of a pair of circumferential end surfaces is a protruded surface has a bigger surface magnetic flux density when compared to the rotor 31G which has a magnet 5G wherein both of a pair of circumferential end surfaces are flat surfaces.

From such result, the rotor 31B which has a magnet 5B comprising the features of the present invention is capable of increasing the magnetic force of the rotor without the need to increase the diameter of the rotor when compared to the rotor 31G which as a conventional magnet 5G.

Meanwhile, the numerical value of the surface magnetic flux density shown in FIG. 11 can be changed by altering a variety of conditions, for example, the material of the magnet, or the material of the core, etc. Even under such circumstances, when compared under identical conditions, the surface magnetic flux density of a conventional rotor and the surface magnetic flux density of a rotor having the features of the present invention will not be reversed. That is, when compared to a conventional rotor, the numerical value of the surface magnetic flux density of a rotor having the features of the present invention is increased.

The present invention can be used in a rotor and a motor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A rotor used for an inner rotor-type motor, comprising:
   a plurality of magnets arranged in a circumferential direction around a vertically extending center axis; and
   a rotor core made of a magnetic material, wherein
   the rotor core comprises:
      an inner core portion which is provided on a radially inner side than the magnet, and axially extends in a cylindrical shape; and
      a plurality of outer core portions which is provided on a radially outer side than the inner core portion, and are arranged in the circumferential direction, the plurality of outer core portions and the plurality of magnets are alternately arranged in the circumferential direction, the magnet includes a pair of circumferential end surfaces which are magnetic surfaces, ones of the magnetic surfaces having identical magnetic polarities of the plurality of magnets are disposed to face each other in the circumferential direction, one of the pair of circumferential end surfaces is a protruded surface which protrudes farther than a plane connecting an inner end and an outer end thereof, and includes an apex portion which is at a farthest point from the plane, one of the pair of circumferential end surfaces is a flat surface, the magnet includes a portion of which a circumferential width is wider than a circumferential width of an outer end surface, and is defined by a magnet piece, and each of the protruded surfaces and the flat surfaces are directly opposed to respective ones of the plurality of outer core portions.

2. The rotor according to claim 1,
wherein in the plurality of magnets, the protruded surfaces and the flat surfaces face each other in the circumferential direction.

3. The rotor according to claim 1,
wherein the protruded surfaces of the plurality of magnets face each other in the circumferential direction.

4. The rotor according to claim 1,
wherein a gap or a non-magnetic layer is interposed between an inner end surface of the magnet and a circumferential surface of the inner core portion, and the rotor core is protruded into the gap or the non-magnetic layer from the circumferential surface of the inner core portion or from a circumferential side surface of the outer core portion, and has a projection which is in contact with the inner end surface of the magnet.

5. The rotor according to claim 1,
wherein the magnet has a portion of which circumferential width is wider than a circumferential width of an inner end surface.

6. The rotor according to claim 5,
wherein the entire inner end surface of the magnet is adjacent to the gap or the non-magnetic layer.

7. The rotor according to claim 1,
wherein in the protruded surface, a surface heading towards the apex portion from the inner end is a planar surface.

8. The rotor according to claim 1,
wherein in the protruded surface, a surface heading towards the apex portion from the inner end is a curved surface.

9. The rotor according to claim 1,
wherein in the protruded surface, a surface heading towards the apex portion from the outer end is a planar surface.

10. The rotor according to claim 1,
wherein in the protruded surface, a surface heading towards the apex portion from the outer end is a curved surface.

11. The rotor according to claim 1,
wherein a distance between the inner end and the apex portion is smaller than a distance between the outer end and the apex portion.

12. The rotor according to claim 1,
wherein the apex portion is an axially extending planar surface.

13. The rotor according to claim 1,
wherein the outer core portion of the rotor core does not radially overlap with an outer end surface of the magnet.

14. The rotor according to claim 13,
wherein a circumferential interval between an edge of the through hole and a circumferential end surface of the outer core portion is substantially regular, or expands along a radially outward direction.

15. The rotor according to claim 1, wherein at least one of the plurality of outer core portions includes an axially penetrating through hole.

16. The rotor according to claim 1,
wherein the magnet is a ferrite-based magnet.

17. The rotor according to claim 1,
wherein the magnet is a neodymium-based magnet.

18. A motor, comprising:
a stationary section; and
a rotary section rotatably supported relative to the stationary section, wherein
the rotary section includes the rotor according to claim 1, and
the stationary section has an armature disposed at a radially outer side of the rotor.

* * * * *